(12) United States Patent
Kato

(10) Patent No.: US 6,707,806 B1
(45) Date of Patent: Mar. 16, 2004

(54) WIRELESS TRANSMITTER WITH POWER CONTROL BASED ON DATA TYPE

(75) Inventor: Toshio Kato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/195,658

(22) Filed: Nov. 18, 1998

(30) Foreign Application Priority Data

Nov. 18, 1997 (JP) .............................. 9-317121

(51) Int. Cl.[7] .................................................. H04J 3/00
(52) U.S. Cl. ....................... 370/336; 370/335; 370/537; 370/904; 455/13.4; 455/522; 455/574
(58) Field of Search ................................. 370/328, 329, 370/335, 336, 311, 208, 522, 904, 535, 537, 538, 540; 455/115, 116, 127, 13.4, 522, 69

(56) References Cited

U.S. PATENT DOCUMENTS

| | | | | |
|---|---|---|---|---|
| 5,757,767 A | * | 5/1998 | Zehavi | ........................ 370/208 |
| 5,896,374 A | * | 4/1999 | Okumura et al. | ........... 370/311 |
| 5,930,230 A | * | 7/1999 | Odenwalder et al. | ........ 370/208 |
| 5,991,284 A | * | 11/1999 | Willenegger et al. | ........ 370/335 |

OTHER PUBLICATIONS

Koji Ohno et al., "Mobile Radio Access Based on Wideband Coherent DS–CDMA", Special Issue on Wideband Coherent DS–CDMA Mobile Radio Access, New Technical Report, NTT vol. 4, No. 3, pp. 9–13.

* cited by examiner

Primary Examiner—Ricky Ngo
Assistant Examiner—Tri H. Phan
(74) Attorney, Agent, or Firm—Venable; Michael A. Sartori; Jung (John) Kim

(57) ABSTRACT

A wireless transmitter transmits data with at least two different levels of required quality on the same wireless channel. The transmitter has a multiplexer that multiplexes the data into frames, each frame containing data with at least two different levels of required quality, and a power controller that controls the transmitting power of each type of data separately within each frame, thereby avoiding the use of excess transmitting power.

11 Claims, 9 Drawing Sheets

FIG. 5

← 32 SYMBOLS →

| | | | | | | |
|---|---|---|---|---|---|---|
| C 1  | 1  | 21 | 41 |     | 601 | 621 |
| C 2  | 2  | 22 | 42 |     | 602 | 622 |
| C 3  | 3  | 23 | 43 |     | 603 | 623 |
| C 4  | 4  | 24 | 44 |     | 604 | 624 |
| C 5  | 5  | 25 | 45 |     | 605 | 625 |
| C 6  | 6  | 26 | 46 |     | 606 | 626 |
| C 7  | 7  | 27 | 47 |     | 607 | 627 |
| C 8  | 8  | 28 | 48 |     | 608 | 628 |
| C 9  | 9  | 29 | 49 |     | 609 | 629 |
| C10  | 10 | 30 | 50 | ··· | 610 | 630 |
| C11  | 11 | 31 | 51 |     | 611 | 631 |
| C12  | 12 | 32 | 52 |     | 612 | 632 |
| C13  | 13 | 33 | 53 |     | 613 | 633 |
| C14  | 14 | 34 | 54 |     | 614 | 634 |
| C15  | 15 | 35 | 55 |     | 615 | 635 |
| C16  | 16 | 36 | 56 |     | 616 | 636 |
| C17  | 17 | 37 | 57 |     | 617 | 637 |
| C18  | 18 | 38 | 58 |     | 618 | 638 |
| C19  | 19 | 39 | 59 |     | 619 | 639 |
| C20  | 20 | 40 | 60 |     | 620 | 640 |

WIRELESS TRANSMITTER WITH POWER CONTROL BASED ON DATA TYPE

BACKGROUND OF THE INVENTION

The present invention relates to a wireless transmitter useful in mobile communication systems such as personal communications systems and digital cellular telephone systems.

Mobile digital communication systems operating by code division multiple access (CDMA), time division multiple access (TDMA), and frequency division multiple access (FDMA) are well known. There is currently much interest in using these systems for multimedia communication, as in the wideband coherent CDMA system developed in Japan. A transmitter in this CDMA system multiplexes two or more types of data with different quality requirements into a single frame, encodes each frame with an error-correcting convolutional code having a ⅓ code rate, and interleaves each coded frame as a safeguard against burst errors. A spreading modulator spreads the interleaved signal, which is then band-limited by a low-pass filter and modulated onto a radio-frequency carrier signal that is radiated from an antenna.

A problem in this system and other similar systems is that all types of transmitted data are coded with the same error-correcting code, and transmitted at the same transmitting power level. Consequently, the error rate for all types of transmitted data is the same, even though the different quality requirements of the data place different requirements on the error-rate.

If, for example, the transmitter multiplexes data having a maximum allowable error rate of $10^{-3}$ with data having a maximum allowable error rate of $10^{-6}$, then the transmitter must operate at a power level sufficient to satisfy the more stringent requirement ($10^{-6}$). Consequently, the data having an allowable error rate of $10^{-3}$ are transmitted at an unnecessarily high power level.

This unnecessarily high power level generates undesired interference with other signals. In particular, in a CDMA system, in which multiple signal channels share the same radio-frequency band, interference limits the number of users who can access the system simultaneously. In TDMA and FDMA systems, interference power limits spectrum efficiency by constraining the channel reuse factor.

SUMMARY OF THE INVENTION

It is accordingly an object of the present invention to eliminate excess transmitting power when different types of data, having different quality requirements, are multiplexed and transmitted on a single wireless channel.

The invented wireless transmitter transmits at least two different types of data, with different quality requirements, on a single wireless channel. The transmitter has a multiplexer that multiplexes the different types of data into frames. Each frame includes a plurality of different types of data. A power controller controls the transmitting power of each type of data individually within each frame, according to the quality requirement of the type of data, so that each type of data is transmitted at the power necessary to obtain the required quality.

Excess transmitting power is eliminated because no type of data is transmitted with more than the necessary power.

BRIEF DESCRIPTION OF THE DRAWINGS

In the attached drawings:

FIG. 5 illustrates the writing of data into the second matrix memory;

DETAILED DESCRIPTION OF THE INVENTION

Embodiments of the invention will be described with reference to the attached illustrative drawings. The embodiments relate to a CDMA mobile cellular communication system providing a connected user with the same channel configuration as provided in conventional integrated services digital networks (ISDNs), comprising two B channels carrying data at a rate of sixty-four kilobits per second (64 kbps) and one D channel carrying data at a rate of sixteen kilobits per second (16 kbps).

Figure 1:
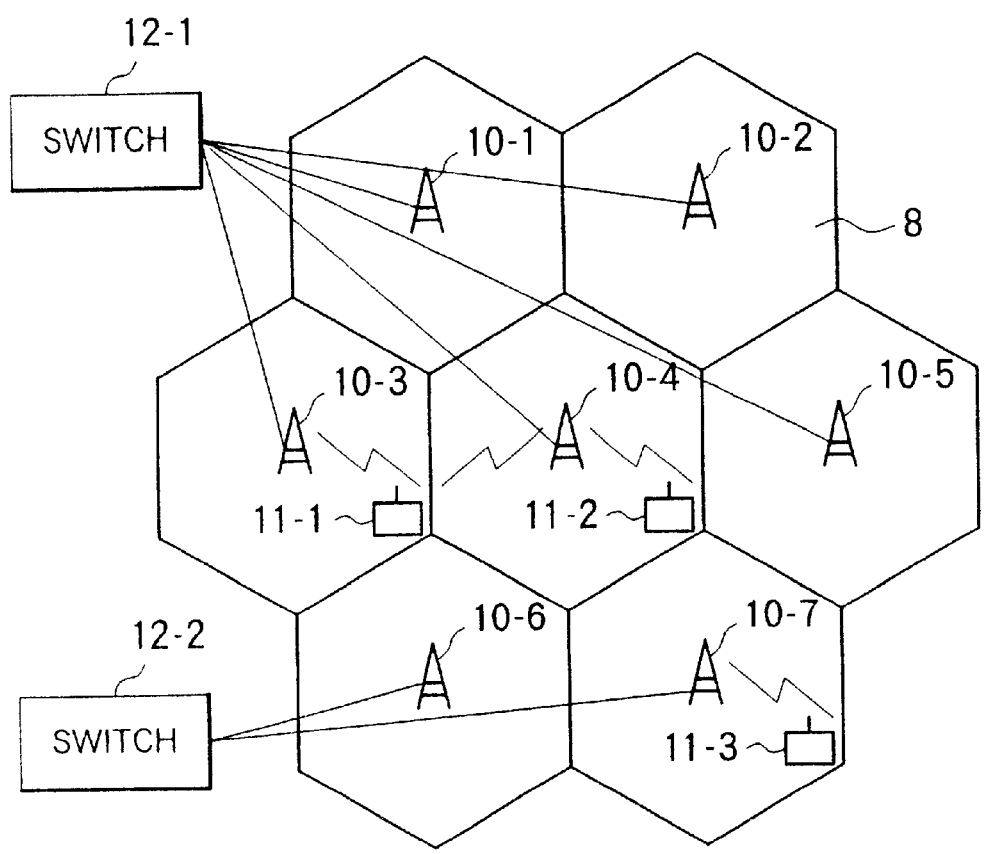
FIG. 1 is a network diagram of a cellular communication network.

Referring to FIG. 1, the system comprises cells with respective base stations 10 (distinguished as 10-1 to 10-7 in the drawing), in which wireless terminals 11 (11-1 to 11-3) move about. Although the cells are actually circular and overlapping, for clarity they are shown as non-overlapping hexagons 8. The base stations are controlled by switching stations 12 (12-1 and 12-2). Normally, a wireless terminal 11 communicates with the base station 10 of the cell in which the wireless terminal 11 is currently located. Cellular systems with this general configuration are in widespread use.

Figure 2:
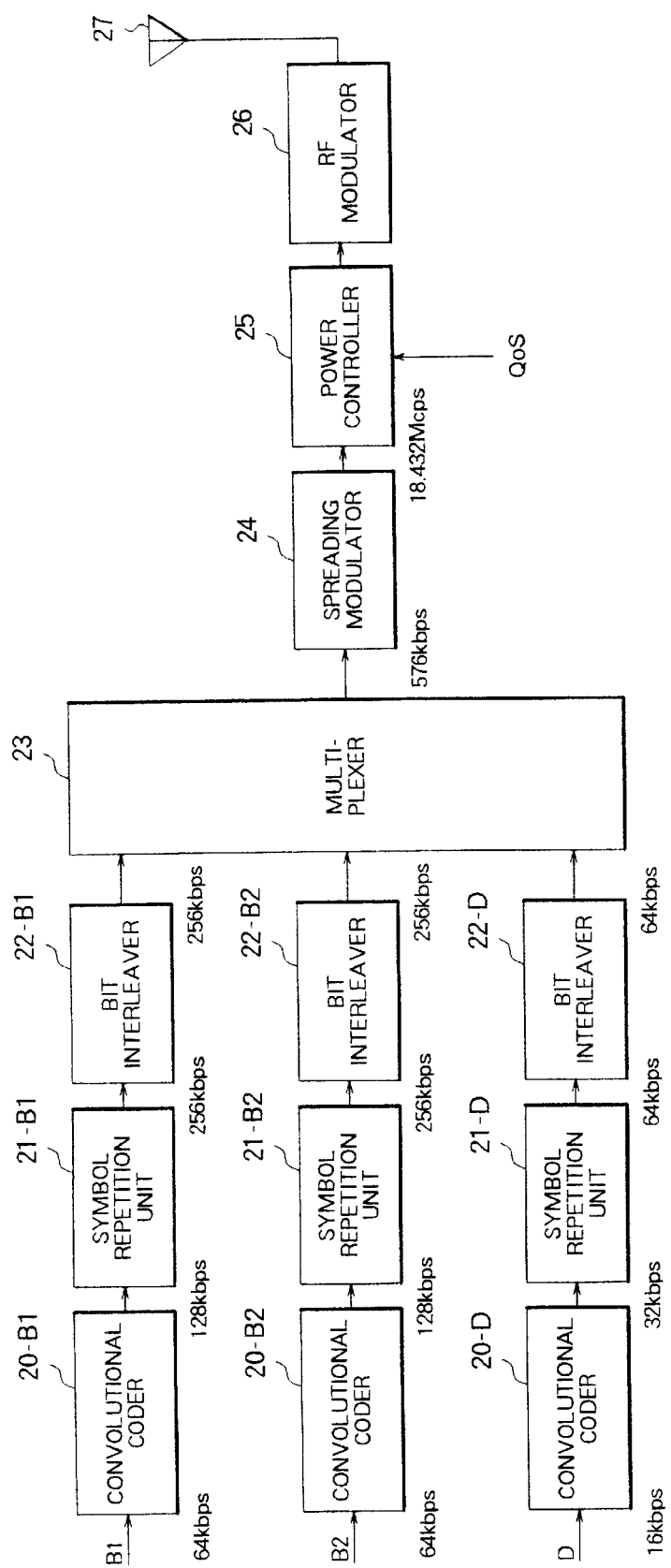
FIG. 2 is a block diagram of a first embodiment of the invented wireless transmitter.

FIG. 2 shows the configuration of a transmitter, embodying the present invention, by which a mobile station 11 transmits to the communicating base station 10. A base station 10 uses this same configuration in transmitting to each communicating mobile station 11.

For the first 64-kbps transmitted channel (channel B1), this first embodiment includes a convolutional coder 20-B1, a symbol repetition unit 21-B1, and a bit interleaver 22-B1. For the second 64-kbps transmitted channel (channel B2), the configuration includes a convolutional coder 20-B2, a symbol repetition unit 21-B2, and a bit interleaver 22-B2. For the 16-kbps transmitted channel (channel D), the configuration includes a convolutional coder 20-D, a symbol repetition unit 21-D, and a bit interleaver 22-D. The configuration also includes a multiplexer 23, a spreading modulator 24, a power controller 25, a radio-frequency (RF) modulator 26, and an antenna 27.

The transmitted data are framed, the frame length being ten milliseconds (10 ms). The processing of a frame by each of the component elements in the configuration in FIG. 2 will be described below.

The convolutional coders 20-B1, 20-B2, and 20-D convolutionally encode their respective input data with a code rate of ½. Convolutional coders 20-B1 and 20-B2 thus convert 64-kbps input data to 128-kbps coded data, while convolutional coder 20-D converts 16-kbps input data to 32-kbps coded data.

The symbol repetition units 21-B1, 21-B2, and 21-D repeat each bit of coded data, thereby doubling the bit rate to 256 kbps on channels B1 and B2 and 64 kbps on channel D. A symbol, in the present context, is synonymous with a bit. Although not so indicated in the drawings, channels B1 and B2 can receive input data at speeds lower than 64 kbps, such as 32 kbps or 16 kbps, in which case the symbol repetition units 21-B1 and 21-B2 repeat each bit four times or eight times to reach the fixed output data rate of 256 kbps. Similarly, bit interleaver 22-D adapts the repeating factor to the input data rate on channel D to reach a fixed output data rate of 64 kbps.

Figure 3:
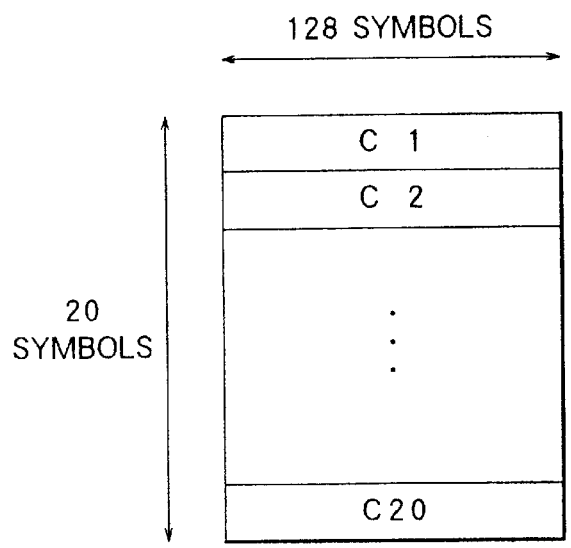
FIG. 3 illustrates a first matrix memory.
Figure 4:
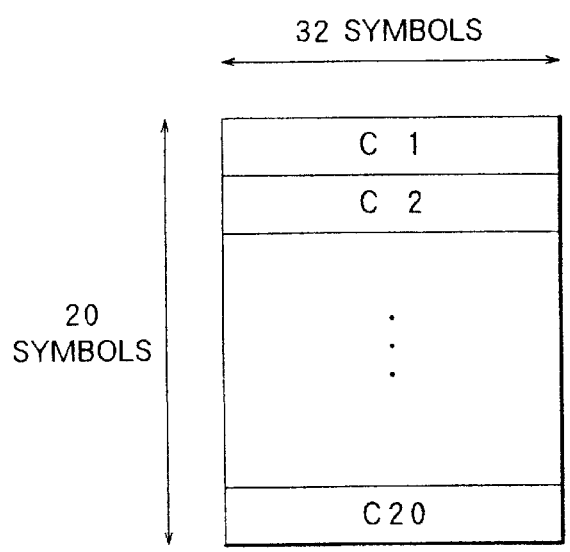
FIG. 4 illustrates a second matrix memory.

The bit interleavers 22-B1, 22-B2, and 22-D use respective matrix memories to perform bit interleaving operations. FIG. 3 shows the configuration of the matrix memories employed by bit interleavers 22-B1 and 22-B2, comprising twenty lines or rows of one hundred twenty-eight bits or symbols each. FIG. 4 shows the configuration of the matrix memory employed by bit interleaver 22-D, comprising twenty lines or rows of thirty-two bits or symbols each. Each configuration has the same number of horizontal lines or rows, numbered from C1 to C20.

Interleaving is performed by writing to each matrix memory vertically and reading each matrix memory horizontally. For example, FIG. 5 shows the order in which bits are written into the matrix memory of bit interleaver 22-D. The first twenty bits are written in the first column, the next twenty bits in the second column, and the last twenty bits in the thirty-second column. When the matrix memory is read, first row C1 is read (bits 1, 21, 41, . . . , 601, 621), then row C2 is read, and row C20 is read last.

The bit interleavers 22-B1, 22-B2, and 22-D do not alter the data rate.

The combined effect of the symbol repetition units 21-B1, 21-B2, and 21-D and bit interleavers 22-B1, 22-B2,and 22-D is to provide time diversity in the transmitted bitstream, each bit reappearing after a fixed time interval.

The multiplexer 23 multiplexes each frame by taking rows of data from the matrix memories of bit interleavers 22-B1, 22-B2, and 22-D in turn. More specifically, a 10-ms multiplexed frame is divided into twenty 500-microsecond (500-µs) slots. The n-th slot includes row Cn from the matrix memory of bit interleaver 22-B1, followed by row Cn from the matrix memory of bit interleaver 22-B2, then by row Cn from the matrix memory of bit interleaver 22-D, where n is an integer from one to twenty. The bit rate of the multiplexed signal is 576 kbps.

Figure 6:
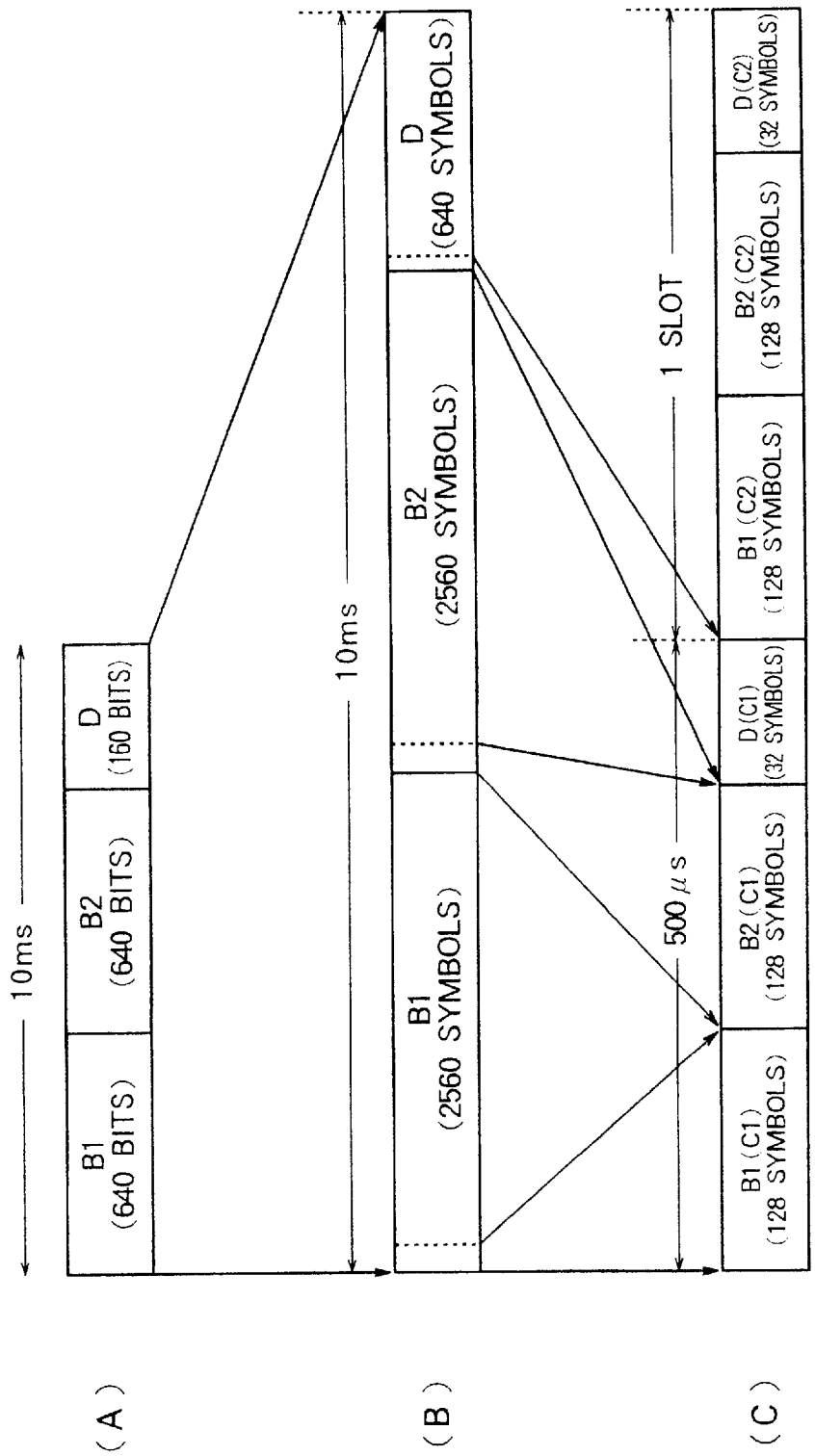
FIG. 6 illustrates coding and slot-interleaving of data.

FIG. 6 illustrates three stages in the process described so far. In the initial stage (A), the convolutional coders 20-B1, 20-B2, and 20-D receive a 10-ms frame of data divided among channels B1, B2, and D as shown. The three channels are depicted as following one another within the frame, without overlapping in time, but the three channels may actually be input in parallel to the coders. Convolutional coding and symbol repeating quadruple the number of bits, as shown in the second stage (B), without changing the 10-ms frame length. The multiplexer 23 then fills the first 500-µs slot of the multiplexed signal with the first interleaved row of bits (C1) from channels B1, B2, and D, taken in that order. The second 500-µs slot is similarly filled with the second interleaved row of bits (C2) from channels B1, B2, and D. This process, referred to as slot interleaving, continues for the twenty slots of the frame.

FIG. 6 shows only one of many possible multiplexing schemes. The n-th row does not have to be placed in the n-th slot. The order of rows can be scrambled, and the order of channels in each slot can also be scrambled. The number of slots per frame does not have to be equal to the number of rows in the matrix memories. Two rows from each matrix memory can be placed in each slot, for example.

The spreading modulator 24 uses an internally-generated spreading code such as a pseudorandom code (PN code) to spread the bitstream output by the multiplexer 23, dividing each bit into thirty-two chips. The chip rate of the spread-modulated signal or baseband signal is 18.432 million chips per second (18.432 Mcps) The baseband signal occupies a single code channel in the CDMA system.

Figure 7:
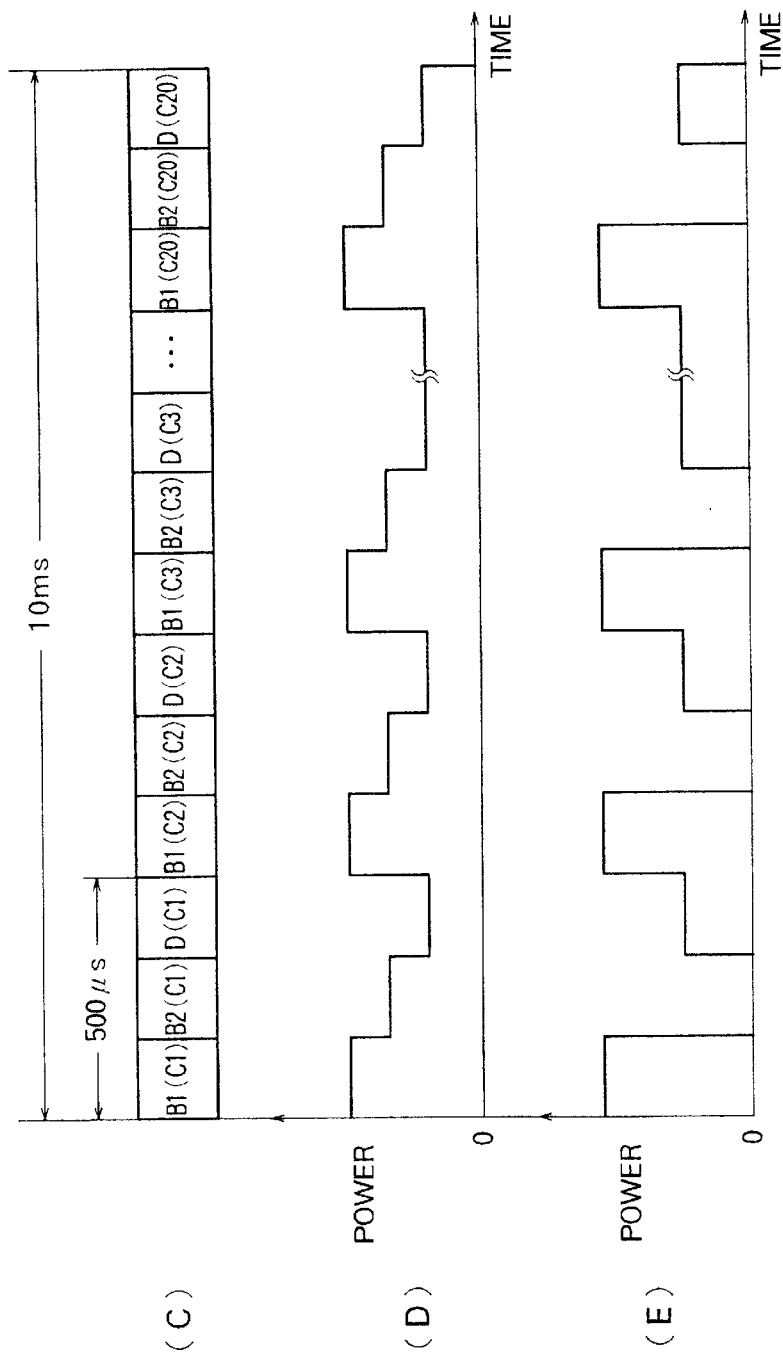
FIG. 7 illustrates power control of the data in FIG. 6.

The power controller 25 is supplied with information indicating a required quality of service (QoS) on channels B1, B2, and D, and controls the transmitting power of these channels accordingly. FIG. 7 illustrates the control scheme when the required quality is high for channel B1, medium for channel B2, and low for channel D. The horizontal axis represents time. The frame configuration (C) is shown as in FIG. 6. Power control is illustrated for a case of transmission of data on all three channels (example D), and a case of transmission only on channels B1 and D (example E). Power control is cyclic, the cycle length matching the slot length.

Text files and other computer data files generally require higher quality (fewer errors) than real-time data such as voice data and video data, while control data that can be re-transmitted if necessary generally have the lowest quality requirement. Thus the scheme illustrated in FIG. 7 is suitable if channel B1 is used for file transfer, channel B2 for digitized voice signals, and channel D for control data, to take one possible example.

The radio-frequency modulator 26 modulates the spread-modulated signal output by the spreading modulator 24 onto a radio-frequency carrier signal at the power level specified by the power controller 25, thereby creating a radio-frequency signal that is amplified and radiated from the antenna 27. The power controller 25 controls the power level by, for example, controlling the gain of a variable-gain power amplifier in the radio-frequency modulator 26. Alternatively, the power controller 25 can control the amplitude of the baseband signal input to the radio-frequency modulator 26.

Figure 8:
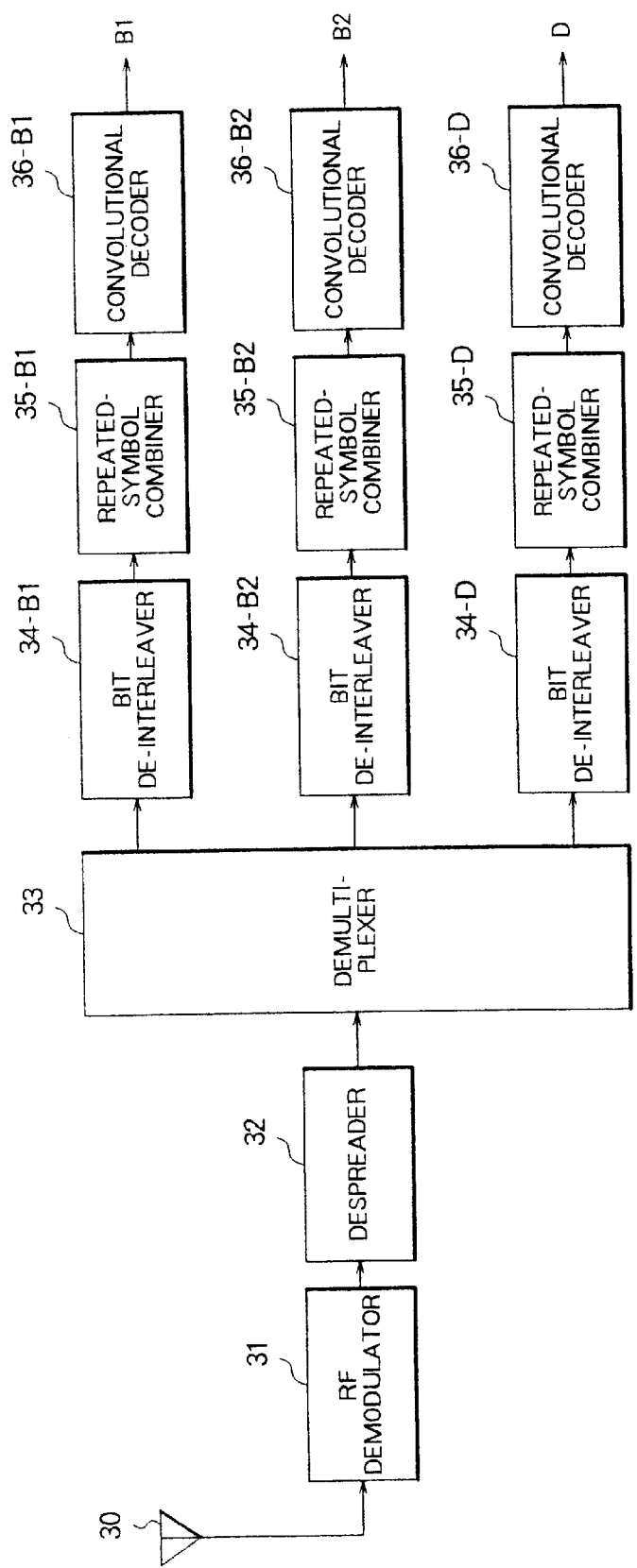
FIG. 8 is a block diagram of a wireless receiver for receiving the data transmitted by the wireless transmitter in FIG. 2.

For reference, FIG. 8 shows a receiver for receiving the signal transmitted by the transmitter in FIG. 2. The transmitted signal is received at an antenna 30, down-converted to the baseband by a radio-frequency demodulator 31, and despread by a despreader 32 to generate a received bitstream with the structure (C) shown in FIGS. 6 and 7. The despreader 32 uses the same spreading code as the spreading modulator 24 in the transmitter, and synchronizes its own spreading code with the spreading code in the received signal by well-known means.

A demultiplexer 33 then performs a slot de-interleaving process reverse to the slot interleaving process performed by the multiplexer 23 in the transmitter to separate channels B1, B2 and D. The channel-B1 data are supplied to a bit de-interleaver 34-B1, the channel-B2 data to a bit de-interleaver 34-B2, and the channel-D data to a bit de-interleaver 34-D, which carry out processes inverse to the bit interleaving processes performed in the transmitter. The de-interleaved data are supplied to repeated-symbol combiners 35-B1, 35-B2, and 35-D, which combine repeated symbols, then to convolutional decoders 36-B1, 36-B2, and 36-D, which perform decoding processes inverse to the convolutional coding processes performed in the transmitter. The decoded data are output on respective channels B1, B2, and D.

The power control performed in the transmitter does not affect the above-described processes performed in the receiver, but the radio-frequency demodulator 31, for example, may also comprise an automatic gain control (AGC) amplifier that keeps the received baseband signal at a constant power level. In this case, an offset is preferably added to the control signal that controls the AGC amplifier, the size of the offset changing cyclically to reflect the different transmitted power of channels B1, B2, and D.

By controlling the transmitting power separately on channels B1, B2, and D, the first embodiment enables channels with comparatively low quality requirements to be transmitted at a lower power than channels with higher quality requirements, so that no channel is transmitted at an unnecessarily high power. The first embodiment thereby reduces the overall interference produced by the transmitted signal in signals transmitted or received by other stations.

The first embodiment can be varied by omitting the slot-interleaving process and transmitting first all the data in channel B1, then all the data in channel B2, then all the data in channel D in each frame, again with separate power control for each channel. Slot interleaving is preferred, however, because slot interleaving breaks up the interference generated by the channel with the highest transmitting power into small, discontinuous segments, which are less likely to interfere seriously with other stations.

The first embodiment can also be varied by multiplexing channels B1, B2, and D on a bit-by-bit basis. Slot interleaving is again preferred, however, because power control is considerably simplified. Switching the power level at intervals of one hundred twenty-eight bits (channels B1 and B2), or thirty-two bits (channel D) is obviously easier than switching the power level at every bit.

As another variation of the first embodiment, convolutional coding, or other error-correcting coding, can be performed after multiplexing instead of before symbol repeating, so that only a single error-correcting coder is required.

Next, a second embodiment will be described.

Figure 9:
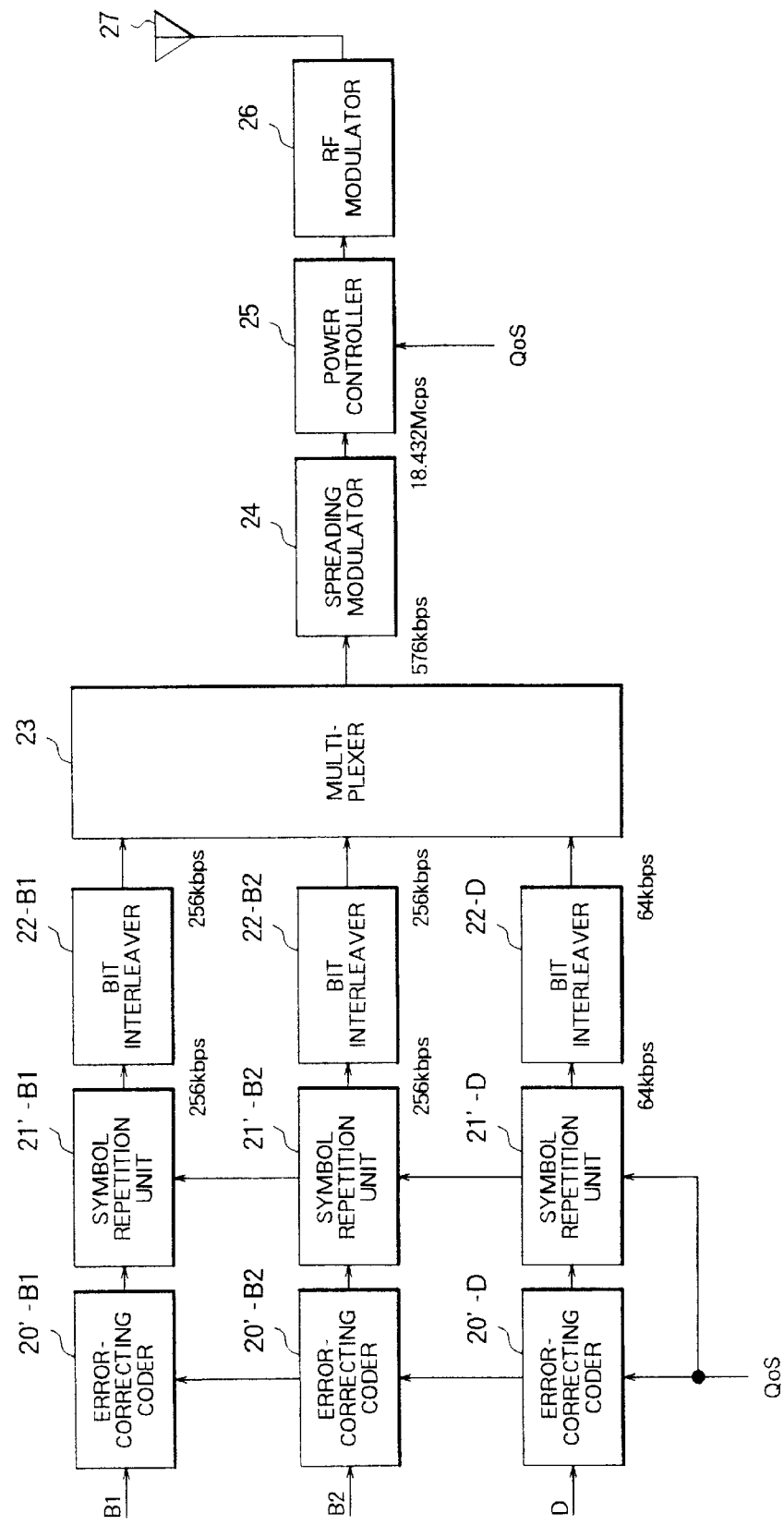
FIG. 9 is a block diagram of a second embodiment of the invented wireless transmitter.

FIG. 9 shows the transmitter configuration in the second embodiment, using the same reference characters as in FIG. 2 for similar elements. The difference between the first and second embodiments is that in the second embodiment, information about the required quality of service (QoS) for each channel is supplied to error-correcting coders 20'-B1, 20'-B2, and 20'-D and symbol repetition units 21'-B1, 21'-B2, and 21'-D as well as to the power controller 25. The error-correcting coders 20'-B1, 20'-B2, and 20'-D select different coding methods according to the required quality levels, stronger error-correcting codes being employed when higher quality is required. The coding methods are not limited to convolutional coding. The symbol repetition units 21'-B1, 21'-B2, and 21'-D adjust the symbol repeating factors according to the code rates of the error-correcting codes to generate the predetermined data rates of 256 kbps on channels B1 and B2 and 64 kbps on channel D.

Figure 10:
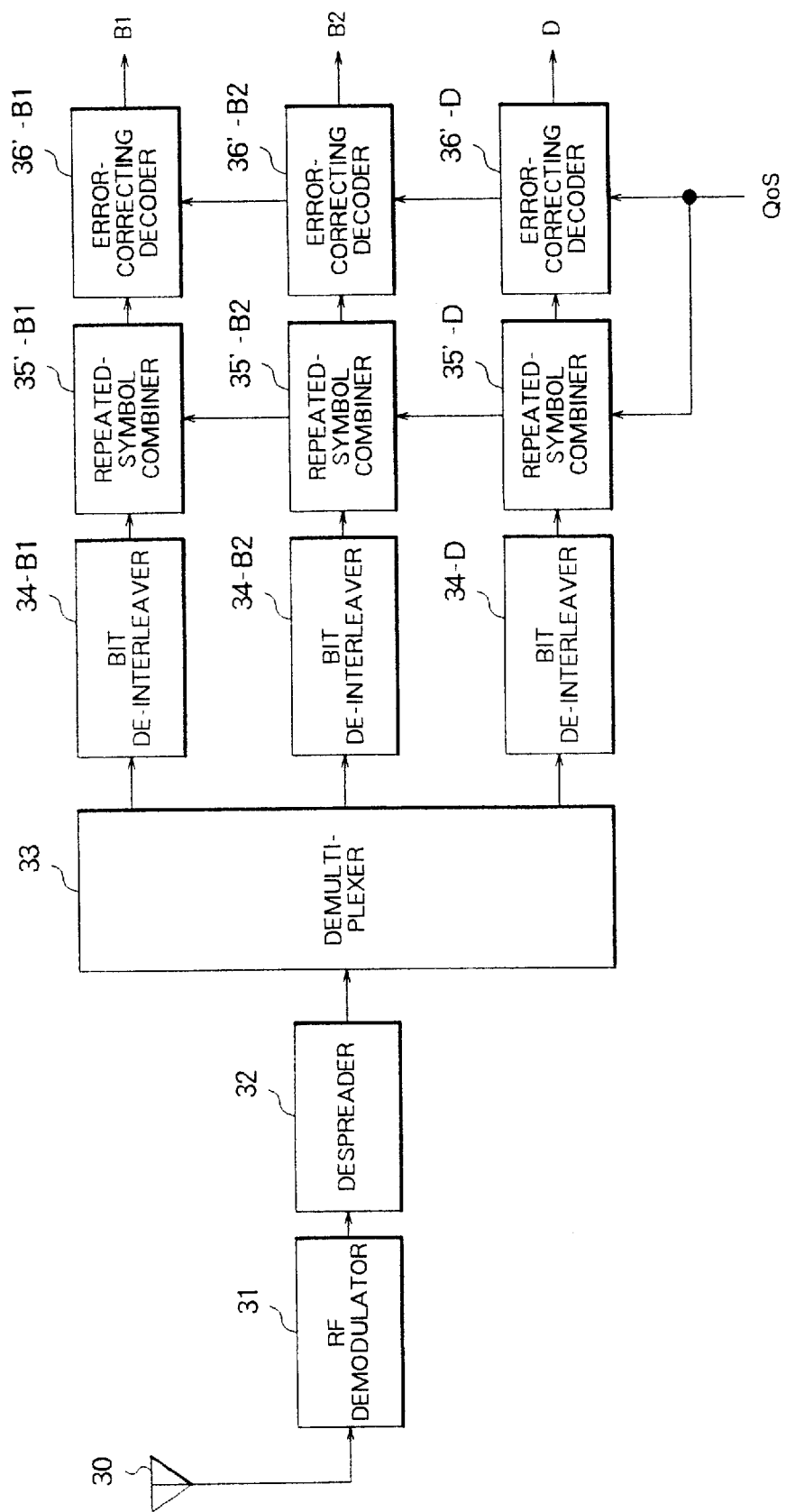
FIG. 10 is a block diagram of a wireless receiver for receiving the data transmitted by the wireless transmitter in FIG. 9.

FIG. 10 shows a receiver for receiving the signal transmitted in the second embodiment, using the same reference characters as in FIG. 8 for similar elements. Information about the required quality of service (QoS) is supplied to the repeated-symbol combiners 35'-B1, 35'-B2, and 35'-D and error-correcting decoders 36'-B1, 36'-B2, and 36'-D, enabling them to perform combining and decoding processes inverse to the repeating and coding processes performed in the transmitter.

Transmitting power is controlled separately on channels B1, B2, and D in the second embodiment as in the first embodiment, but to the extent that differing quality requirements can be satisfied by the use of different error-correcting codes, the dynamic range of power control can be reduced, thereby reducing the performance requirements of the power controller 25 and the components controlled by the power controller 25.

In addition to the variations already mentioned, the channel configuration can be varied from the ISDN configuration of B1, B2, and D channels to any configuration with at least two channels carrying different types of data, with different quality requirements, which are transmitted in the same frames on the same wireless channel between the base and mobile stations.

The invention can also be practiced in TDMA systems, FDMA systems, and hybrid TDMA/FDMA systems in which the transmitted signal is divided into frames and each frame is used to transmit at least two different types of data with different quality requirements.

The invention can be practiced in one-to-one communication systems as well as in multiple-access systems, and is not limited to mobile systems.

Those skilled in the art will recognize that further variations are possible within the scope claimed below.

What is claimed is:

1. A wireless transmitter transmitting at least two different types of data, with different quality requirements, on a single wireless channel, with controllable transmitting power, comprising:

a plurality of interleavers interleaving respective types of said data, each of said interleavers having a matrix memory in which said data are written in lines in a first direction, then read in lines in a second direction orthogonal to said first direction;

a multiplexer multiplexing said different types of data into frames, each frame being divided into a plurality of slots, for transmission on said wireless channel, by reading at least one line of data in said second direction from the matrix memory in each of said plurality of said interleavers, and placing the data thus read in a single one of said slots; and a power controller coupled to said multiplexer, controlling the transmitting power of each of said types of data separately within each said frame, according to the quality requirements of said types of data.

2. The wireless transmitter of claim 1, wherein said multiplexer reads just one line of data per slot from each said matrix memory.

3. The wireless transmitter of claim 1, further comprising a plurality of error-correcting coders encoding respective types of said data before said data are multiplexed by said multiplexer.

4. The wireless transmitter of claim 3, wherein said error-correcting coders employ different error-correcting codes, depending on the quality requirements of said different types of data.

5. The wireless transmitter of claim 1, wherein said wireless channel is a code channel in a code division multiple access system.

6. A method of transmitting at least two different types of data, with different quality requirements, from a first station to a second station in a wireless communication system, comprising the steps of:

separately interleaving each of said types of data by writing lines of said data into a matrix memory in a first direction, then reading lines of said data from said matrix memory in a second direction orthogonal to said first direction;

multiplexing said different types of data into frames, each frame being divided into a plurality of slots, by placing, for each of said plurality of different types of data, at least one line of data read in said second direction in each said slot;

transmitting each said frame on a single wireless channel from said first station to said second station; and controlling transmitting power of each of said types of data separately within each said frame, according to the quality requirements of said types of data.

7. The method of claim 6, wherein each said slot receives just one line of data of each of said plurality of types.

8. The method of claim 6, further comprising the step of coding said data, by an error-correcting code, before said step of multiplexing.

9. The method of claim 8, wherein said step of coding employs different error-correcting codes, depending on the quality requirements of said different types of data.

10. The method of claim 6, wherein said wireless channel is a code channel in a code division multiple access system.

11. The wireless transmitter of claim 1, wherein each of said plurality of interleavers interleaves only one type of said at least two types of data.

\* \* \* \* \*